United States Patent
Urata et al.

(10) Patent No.: US 7,917,687 B2
(45) Date of Patent: Mar. 29, 2011

(54) FLASH MEMORY APPARATUS AND ACCESS METHOD TO FLASH MEMORY

(75) Inventors: Kaoru Urata, Kanagawa (JP); Masakazu Yoshimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 426 days.

(21) Appl. No.: 11/732,658

(22) Filed: Apr. 4, 2007

(65) Prior Publication Data

US 2007/0255890 A1 Nov. 1, 2007

(30) Foreign Application Priority Data

Apr. 6, 2006 (JP) ................. P2006-105711

(51) Int. Cl.
*G06F 12/00* (2006.01)
*G06F 13/00* (2006.01)
*G06F 13/28* (2006.01)

(52) U.S. Cl. ......... 711/103; 711/149; 711/154; 711/171

(58) Field of Classification Search .................. 711/103, 711/149, 154, 171
See application file for complete search history.

(56) References Cited

U.S. PATENT DOCUMENTS

| 2002/0026566 A1* | 2/2002 | Awada et al. ............... 711/162 |
| 2005/0086425 A1* | 4/2005 | Okuno ........................ 711/105 |
| 2006/0098945 A1* | 5/2006 | Kim ............................ 386/98 |
| 2007/0033376 A1* | 2/2007 | Sinclair et al. .............. 711/203 |

FOREIGN PATENT DOCUMENTS

| JP | 11 234625 | 8/1999 |
| JP | 11 308558 | 11/1999 |
| JP | 2000 194683 | 7/2000 |
| JP | 2005 92630 | 4/2005 |

* cited by examiner

*Primary Examiner* — Kevin L Ellis
*Assistant Examiner* — Ryan Bertram
(74) *Attorney, Agent, or Firm* — Frommer Lawrence & Haug LLP; William S. Frommer; Thomas F. Presson

(57) ABSTRACT

There is provided a flash memory apparatus for storing data aggregate having a plurality of types of data in and reproduce the data aggregate from a flash memory via a plurality of ports. The flash memory apparatus includes a plurality of access request units configure to request to write data in one block of the flash memory by aligning a writing position of one block data with a page unit on a data type basis of the flash memory when the data classified by type that are inputted via the ports corresponding to the access request units on the one-to-one basis are stored to reach an amount relative to one block of the flash memory, and an access controller configured to write the data in the flash memory during time division allocated per port based on the requests incited by the respective access request units.

7 Claims, 7 Drawing Sheets

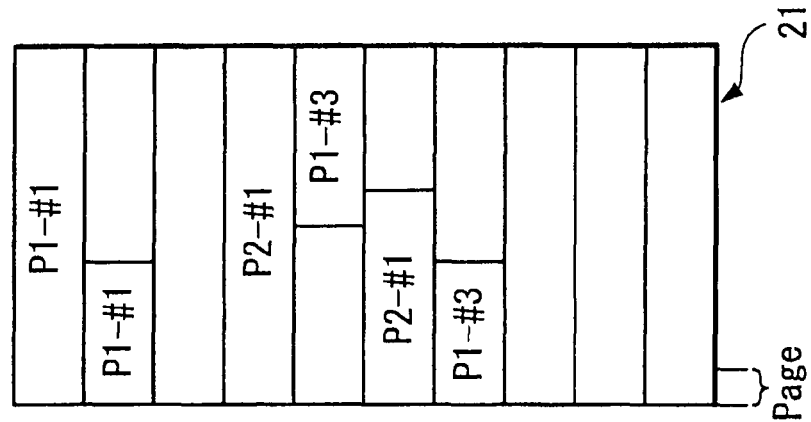
FIG. 1C
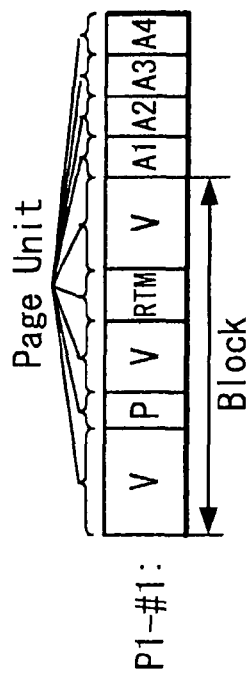
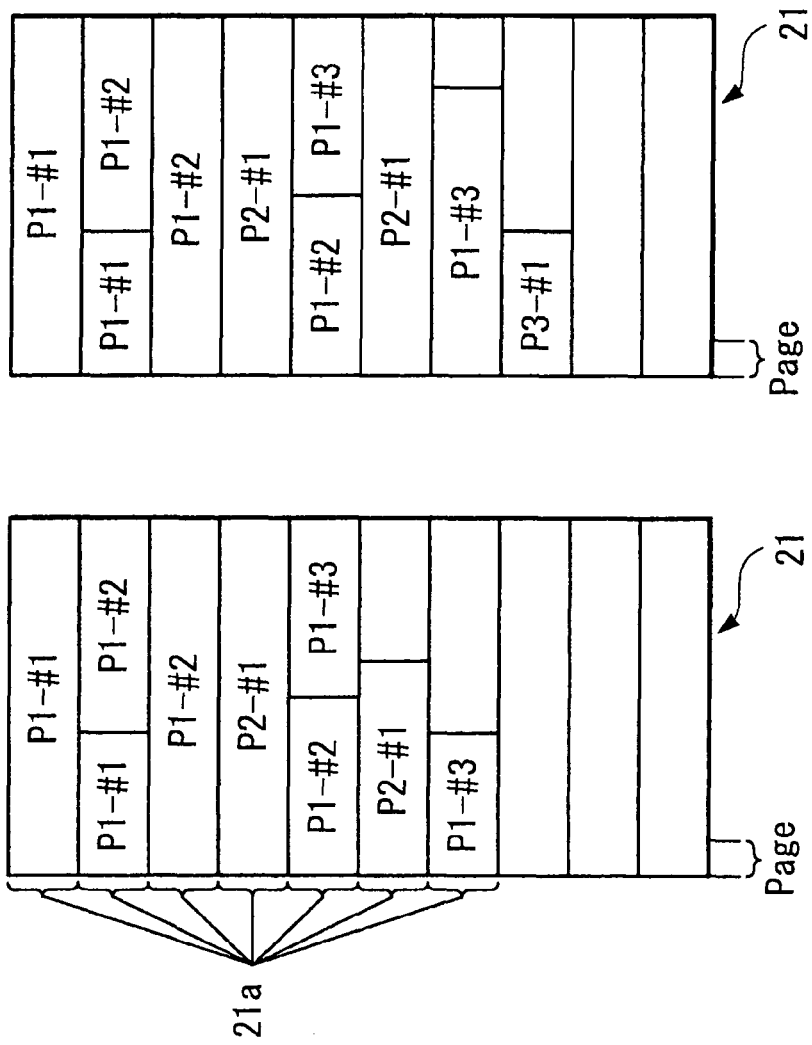
FIG. 1B
FIG. 1A

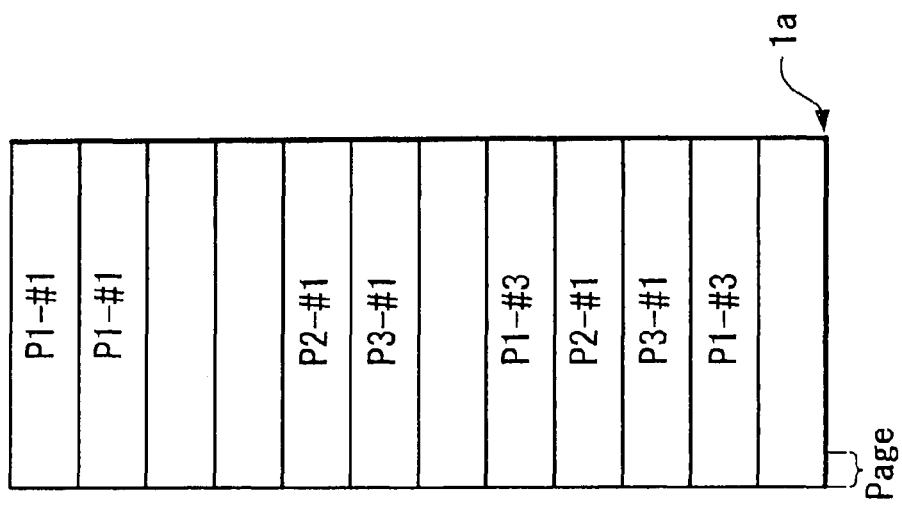
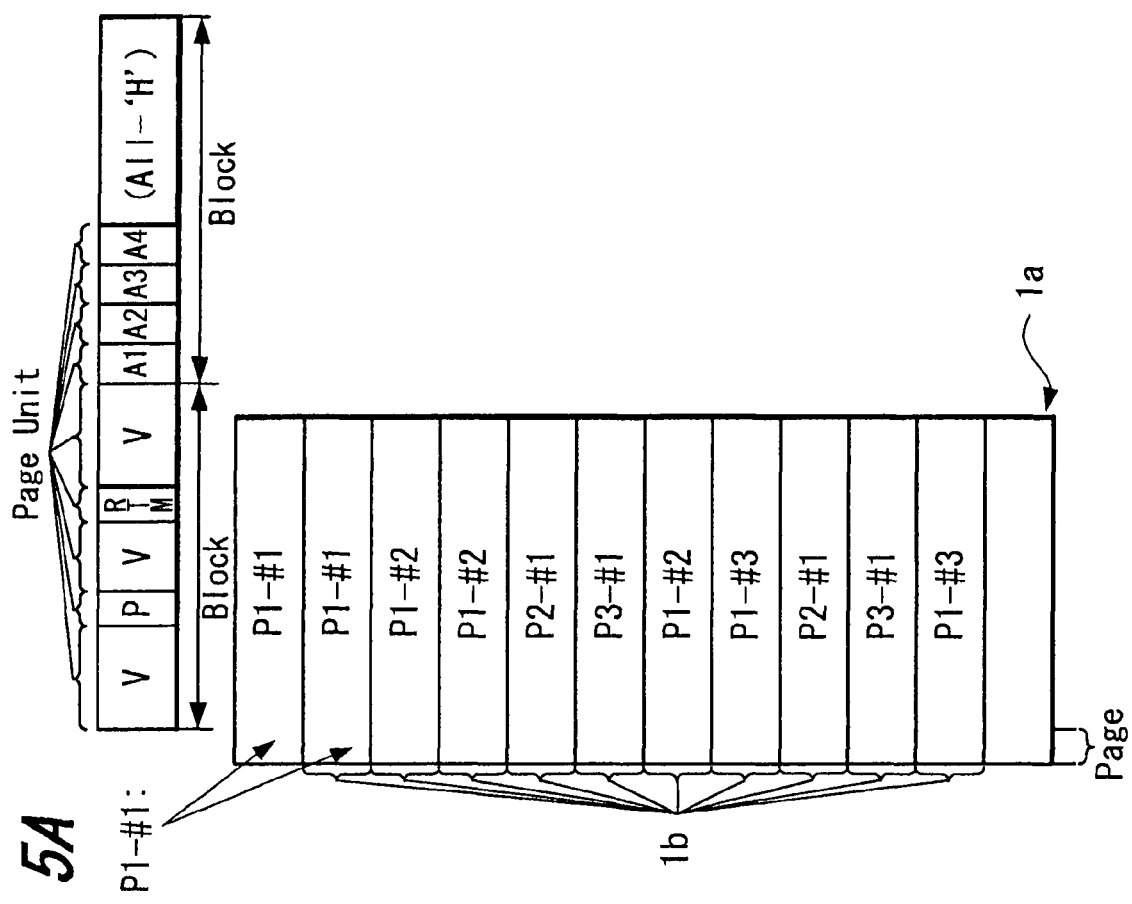
FIG. 5A
FIG. 5B

FLASH MEMORY APPARATUS AND ACCESS METHOD TO FLASH MEMORY

CROSS REFERENCES TO RELATED APPLICATIONS

The present invention contains subject manner related to Japanese Patent Application JP 2006-105711 filed in the Japanese Patent Office on Apr. 6, 2006, the entire contents of which being incorporated herein by reference.

BACKGROUND OF THE INVENTION

1. Field of the Invention

The present invention relates to a flash memory apparatus for storing data in and reproduce the data via a plurality of ports, and more specifically, relates to a flash memory apparatus having a characteristic in a method for accessing to a flash memory in a case where data aggregate having a plurality of types of data are stored or reproduced via respective ports.

2. Description of the Related Art

As a system for a plurality of external apparatus to store data in and reproduce data from a single storage, there has generally been used a system in which a storage having a plurality of ports allocated with respective timeslots (i.e., time-frame when a single storage accepts an access from a port) via which the plurality of external apparatus access to the single storage.

In the field of television broadcasting, for example, Japanese published unexamined application H11-234625 (paragraphs 0013 to 0019, FIGS. 1 and 5) and Japanese published unexamined application H11-308558 (paragraphs 0022 to 0025, FIGS. 1 and 2) disclose an AV (Audio Video) server used as a storage apparatus that includes a HDD (Hard Disc Drive) with large capacity as a storage medium and also includes a plurality of ports to which timeslots are allocated for storing, reproducing, editing, transmitting video data, audio data, and the like.

SUMMARY OF THE INVENTION

The AV server described in the above patent documents includes a HDD as a storage medium; however, a flash memory is supposed to be a prospective storage medium in view of maintenance.

A flash memory usually includes a write-buffer used as a sub-memory independent of a flash memory main body in order to prevent damage caused by frequently writing into the same memory cell, and data subject to writing are written into the write-buffer instead of being written into the flash memory main body. The data written into the write-buffer is then written into the flash memory main body. Having written one block data of the flash memory main body into the flash memory main body, the write-buffer is released.

Therefore, in a case where a flash memory apparatus including a flash memory as storage medium is provided with a plurality of ports via which data are written in the flash memory, there may arise a unique drawback in the configuration of the flash memory.

FIG. 1 and FIG. 2 are diagrams illustrating respective examples of prospective methods of writing, in a case in which a clip having a plurality of types of essence such as video data, 4-channels audio data, proxy data (low bit rate video data for video editing) and real time data (e.g., information illustrating a time cord or recording place), are written into a flash memory via a plurality of ports.

Among these, in the method shown in FIG. 1, respective ports have individual pointers, and clips inputted from the respective ports are written into separate write-buffers (not shown) in accordance with the respective essence. When the essence relative to one page of the flash memory main body 21 that is a smaller unit than one of the blocks 21a of the flash memory main body 21 is written into a write-buffer, the essence relative to one page is written into separate one of the blocks 21a per port. Specifically, the essence is written into the flash memory main body 21 on a page unit basis simultaneously with being written into the separate one of the blocks 21a of the flash memory main body 21 for respective ports.

FIG. 1A shows a condition where P1-#1 to P1-#3 (number after "P," represents a port number and number after "#" shows a clip number) that are clips from a first port and P2-#1 that represent clips from a second port are written into separate blocks 21a (clips P2-#1 and P1-#3 are currently being inputted and written into the separate blocks 21a). In the upper portion of the figure, having given as an example of the CLIP P1-#1, the state where respective essence such as video data "V", 4-channels audio data "A1 to A4", proxy data "P" and real time metadata "RTM" are written into on a page unit basis is shown (fewer number of pages relative to one block is shown in FIG. 1 and FIG. 2; however, the actual number of pages may generally be more than the number of pages shown in FIG. 1 and FIG. 2).

This method of writing has an advantage in that a certain amount of free space may be obtained after one clip is deleted, because the essence is written into the separate blocks 21a for respective ports. FIG. 1C shows a condition where the written clips P1-#2 in FIG. 1A) have been deleted.

However, in this method of writing, since one write-buffer is used per port, if the number of the write-buffers is supposed to be N, the write-buffers may not be sufficient in number when the clips are simultaneously inputted from N+1 ports. Given as one example, if N equals 3, a clip begins to be inputted from a third port under the condition of FIG. 1A, and hence no write-buffers may be available for the third port.

In such a case, to secure a write-buffer used for a (N+1)th port, after having copied data already written into any one of write-buffers to another place, a clip from the (N+1)th port (clip P3-#1 from the third port in the figure) may also be written into another block 21a by allowing the (N+1)th port to use the write-buffer that has just been used as is illustrated in FIG. 1B.

Further, in this method of writing, since the essence relative to one page is written into the flash memory main body 21 from the write-buffer, the essence that has not been written into the flash memory main body 21 remains in the discontinuous address regions of the write-buffer in a condition where the write-buffer has not been released. In such a condition, if a new essence is overwritten into the write-buffer, the new essence is only overwritten after the essence written into the write-buffer has once been copied to another place.

These copying processing are called "garbage processing". According to the method of writing in FIG. 1, the writing rates to the flash memory drastically decrease due to performing the garbage processing.

On the other hand, in the method in FIG. 2, the clip inputted from each port is written into one write-buffer (not shown in the figure) according to the essence using a single pointer. Then, when the essence relative to one page is written into the write-buffer, the essence relative to one page is sequentially written into the same block 21a of the flash memory main body 21 until the end of the block, and the same operation is repeated for the next block 21a. Specifically, the essence is written into the flash memory main body 21 on a page unit basis, and the clip from each port is interleaved and written into the same block 21a.

FIG. 2A shows the condition where the same clips P1-#1 to P2-#3 and P3-#1 as those shown in FIG. 1B are interleaved and written into the same block 21a.

In this method of writing, one write-buffer may be used irrespective of the number of the ports. After having written the data into until the end of each block 21a implying that the data relative to one block be written into the flash memory main body 21, the write-buffer may be released. Accordingly, no garbage processing is performed, thereby resulting in no deterioration in the writing rates as shown in the method of FIG. 1.

However, in the method of writing, since the clip from each port is interleaved and written into the same block 21a when deleting one clip, free space may be fragmented on a page unit basis. FIG. 2B shows a condition the written clips P1-#2 in FIG. 2A are deleted (condition corresponding to FIG. 1C in the method in FIG. 1).

In a case where the free space is fragmented after deleting the clips in a filing system that controls the clips in the flash memory, since a minimum unit of control (cluster) may be reduced in a small size indicating "page", the control may be complicated. Moreover, when reusing the free space, defragmentation may be necessary.

In the methods illustrated in FIG. 1 and FIG. 2, since the writing rates decrease due to performing garbage processing; or the free space may be fragmented after deleting the data, processing such as defragmentation may be necessary. Thus, in either of the methods, the data may not be efficiently written into the flash memory.

In view of the above description, according to an embodiment of the present invention, in a case where data aggregate having a plurality of types of data such as the aforementioned clip is written into the flash memory via a plurality of ports, there is provided a method for preventing a decrease in the writing rate when writing the data aggregate in the flash memory by controlling garbage processing from being performed and capturing a certain amount of free space after having deleted the data aggregate.

According to an embodiment of the present invention, there is provided a flash memory apparatus for storing data aggregate having a plurality of types of data in and reproduce the data aggregate from a flash memory via a plurality of ports. The flash memory apparatus includes a plurality of access request units configure to request to write data in one block of the flash memory by aligning a writing position of one block data with a page unit on a data type basis of the flash memory when the data classified by type inputted via the ports corresponding to the access request units on the one-to-one basis are stored to reach an amount relative to one block of the flash memory, and an access controller configured to write the data in the flash memory during time division allocated per port based on the requests incited by the respective access request units.

In the flash memory apparatus, the data inputted via a plurality of ports are classified and stored by type by the access request units corresponding to the respective ports on the one-to-one basis. An access controller requests to write data in one block of the flash memory by aligning a writing position of one block data with a page unit on a data type basis of the flash memory when the stored data reach an amount relative to one block of the flash memory.

An access controller requests to write data in one block of the flash memory by aligning a writing position of one block data with a page unit on a data type basis of the flash memory during time division allocated per port based on the requests incited by the respective access request units.

Thus, in the flash memory apparatus, the data are written into in one block of the flash memory per port by aligning a writing position of the data with a page unit on a data type basis of the flash memory. In other words, the data are page-aligned according to types of the data and block-aligned according to respective ports when writing into the flash memory.

As mentioned earlier, a flash memory generally has a configuration such that data are written into a flash memory main body through a write-buffer. After one block of the data have been written into the flash memory main body, the buffer is released. However, in the flash memory apparatus, data are written into the flash memory main body with one block unit through the write-buffer. Therefore, the write-buffer is released when data from one port is written into the flash memory by the access controller.

Thus, since a write-buffer is released when data from one port is written into the flash memory (write-buffer may be used when data from the next port is written during time division processing), sufficient number of write-buffers are available irrespective of the number of ports.

Accordingly, since the garbage processing (copying processing of data inside the write-buffer) is prevented from being performed without releasing the write-buffer, a decrease in writing rate in the flash memory may be prevented.

Further, since data aggregate is written with a block unit per port, a certain amount of free space of the block unit may be obtained when one data aggregate is deleted.

Accordingly, in the filing system that control the clips inside the flash memory, the minimum unit of control (cluster) may be increased in size as a block, and processing such as defragmentation may not be necessary when reusing the free space.

Further, since the writing position of the data classified by type is aligned with a page unit, the data may be read out by type from the flash memory on a page unit basis when reproducing the data. However, a decrease in the writing rates may be prevented since the reading rates do not deteriorate when reading the data with the page in the flash memory. Furthermore, when two or more types of data in the data aggregate are reproduced in combination, necessary types of data can respectively be read out on a page unit basis from the data aggregate in the flash memory. Thus, the maximum reading rates may be realized by reducing to reading out unnecessary and unused data.

Subsequently, according to an embodiment of the present invention, there is provided a method for accessing to a flash memory on storing and reproducing data aggregate including a plurality of types of data via a plurality of ports. This method includes a first step of requesting to write data in one block of the flash memory by aligning a writing position of one block data with a page unit on a data type basis in the flash memory when the data classified by type that are inputted via the ports corresponding to the access request units on the one-to-one basis are stored to reach an amount relative to one block of the flash memory; and a second step of writing the data in the flash memory during time division allocated per port based on the requests incited by the first step.

Furthermore, when the reading rates are prevented from being decreased when reading the respective types of data from the flash memory, or when two or more types of data in the data aggregate are reproduced in combination, necessary types of data may respectively be read out on a page unit basis from the data aggregate in the flash memory. Thus, the maximum reading rates may be realized by reducing to reading out unnecessary and unused data.

According to an embodiment of the present invention, in a case where data aggregate having a plurality of types of data is written into the flash memory via a plurality of ports, there is provided a method for preventing a decrease in the writing rate when writing the data aggregate in the flash memory by controlling garbage processing from being performed and capturing a certain amount of free space after deleting the data aggregate.

Furthermore, when the reading rates are prevented from being decreased, or when reading the respective types of data from the flash memory, or two or more types of data in the data aggregate are reproduced in combination, necessary types of data may respectively be read out on a page unit basis from the data aggregate in the flash memory. Thus, the maximum reading rates may be realized by reducing to reading out unnecessary and unused data.

BRIEF DESCRIPTION OF THE DRAWINGS

FIG. 1 is a diagram illustrating one example of a method of writing data to a flash memory via a plurality of ports according to a related art;

FIG. 5 is a diagram illustrating a method of writing data to a flash memory according to an embodiment of the present invention;

DESCRIPTION OF THE PREFERRED EMBODIMENTS

Figure 2B:
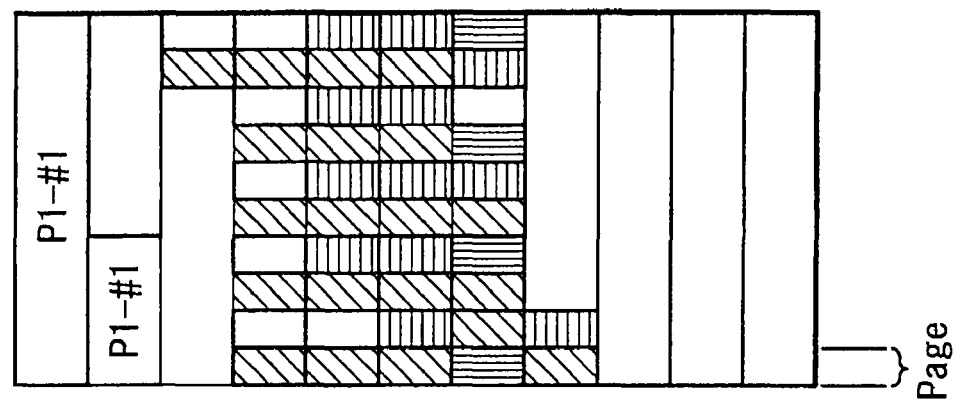
FIG. 2 is a diagram illustrating one example of a method of writing data to a flash memory via a plurality of ports according to a related art.
Figure 2A:
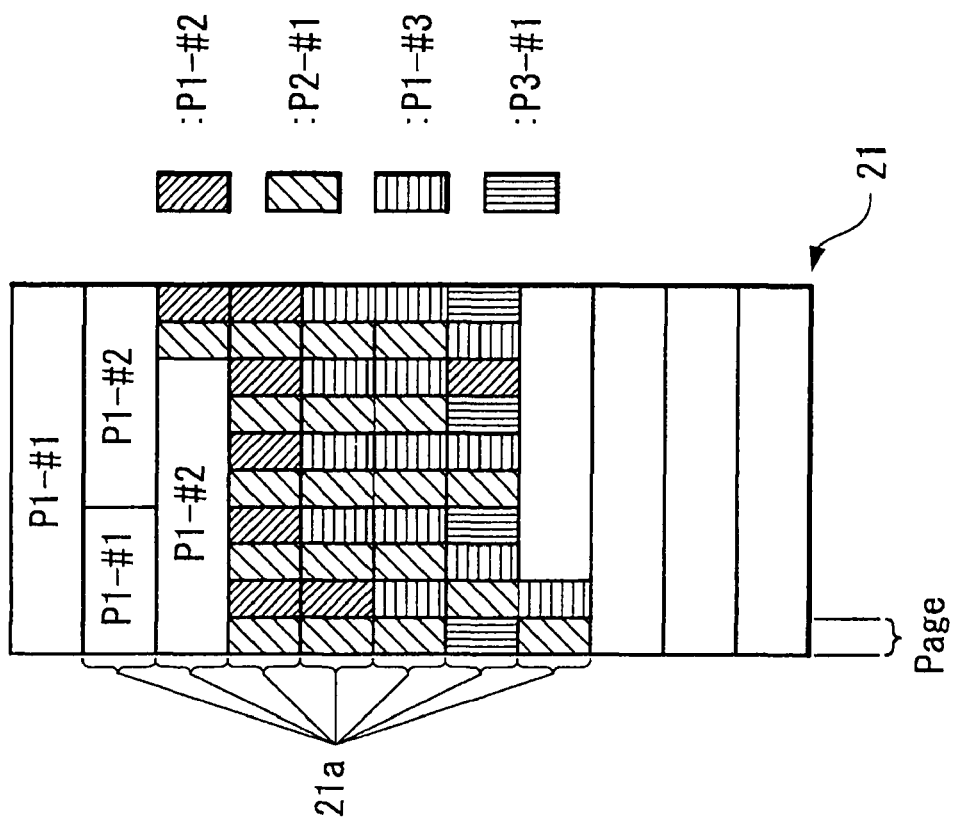
Figure 3:
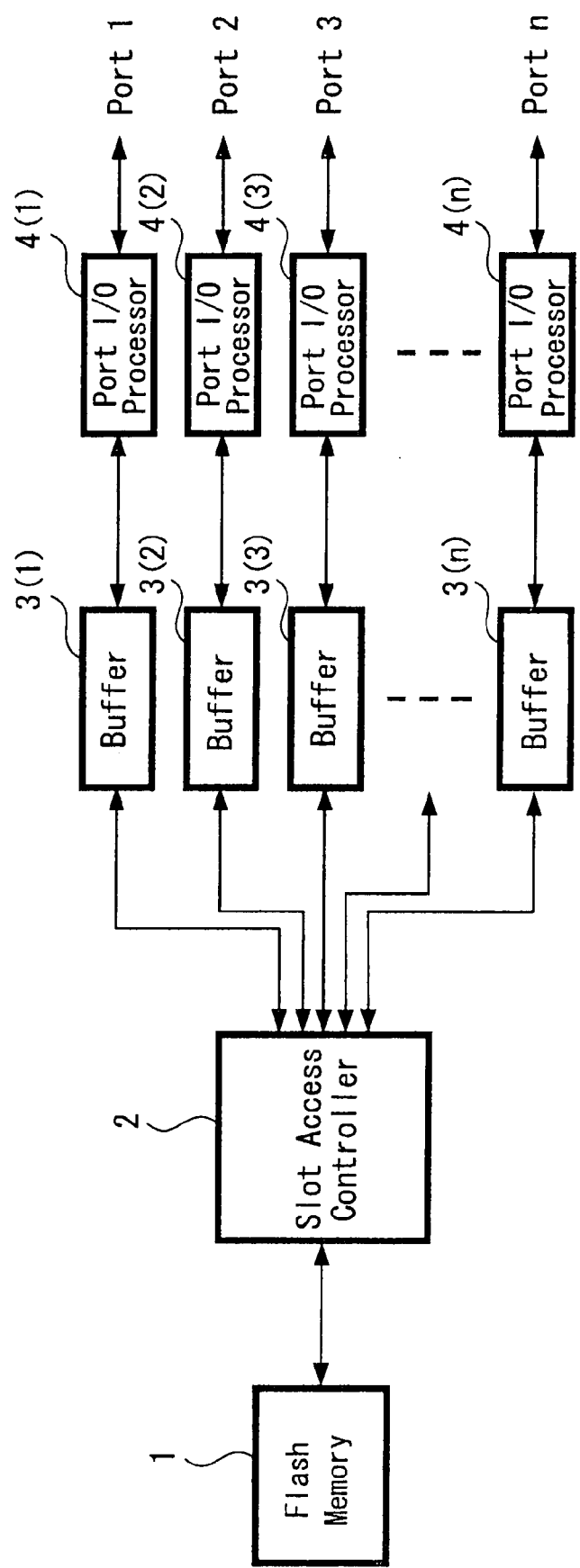
FIG. 3 is a block diagram illustrating an entire configuration of a flash memory apparatus to which an embodiment of the present invention is applied.

Embodiments of the present invention are described below with reference to the drawings. FIG. 3 is a block diagram illustrating an entire configuration of a flash memory apparatus according to an embodiment of the present invention. The flash memory apparatus includes a flash memory 1, a slot access controller 2, N buffer portions 3(1) to 3(n) and N port input/output processors 4(1) to 4(n).

The flash memory 1 is configured such that data are written into a flash memory main body through a write-buffer which is released once one block data have been written into the flash memory main body.

The slot access controller 2 controls an access to the flash memory 1 via a plurality of ports Port-1 to Port-n provided with the flash memory apparatus by allocating a timeslot to each of the ports Port-1 to Port-n.

The buffer portions 3(1) to 3(n) and the port input/output processors 4(1) to 4(n) respectively correspond to the ports Port-1 to port-n on the one-to-one basis. The port input/output processors 4(1) to 4(n) implements signal processing (e.g., compression) for converting data inputted via the respective ports Port-1 to port-n into data into a suitable format for the flash memory storage, and implements signal processing (e.g., expanding compressed data) for converting data transmitted via the respective buffer portions 3(1) to 3(n) into suitable signals for outputting via the respective ports Port-1 to port-n.

In a case where data are stored via a port-i selected from the ports Port-1 to port-n, the data inputted via the port-i are temporarily stored in a buffer portion 3(i) through a port input/output processor 4(i). The data stored in the buffer portion 3(i) are read out from the buffer portion 3(i) by the slot access controller 2 to a timeslot that is allocated to the port-i, and the data are then written into the flash memory 1 by the slot access controller 2.

Further, in a case where data are reproduced via a port-j, the data are read out from the flash memory 1 by the slot access controller 2 during a timeslot that is allocated to the port-j by the slot access controller 2, and the data are then temporarily stored in a buffer portion 3(j). The data stored in the buffer portion 3(j) are then read out from the buffer portion 3(j), and the data is then outputted from the port-j through the processing of a port input/output processor 4(j).

Figure 4:
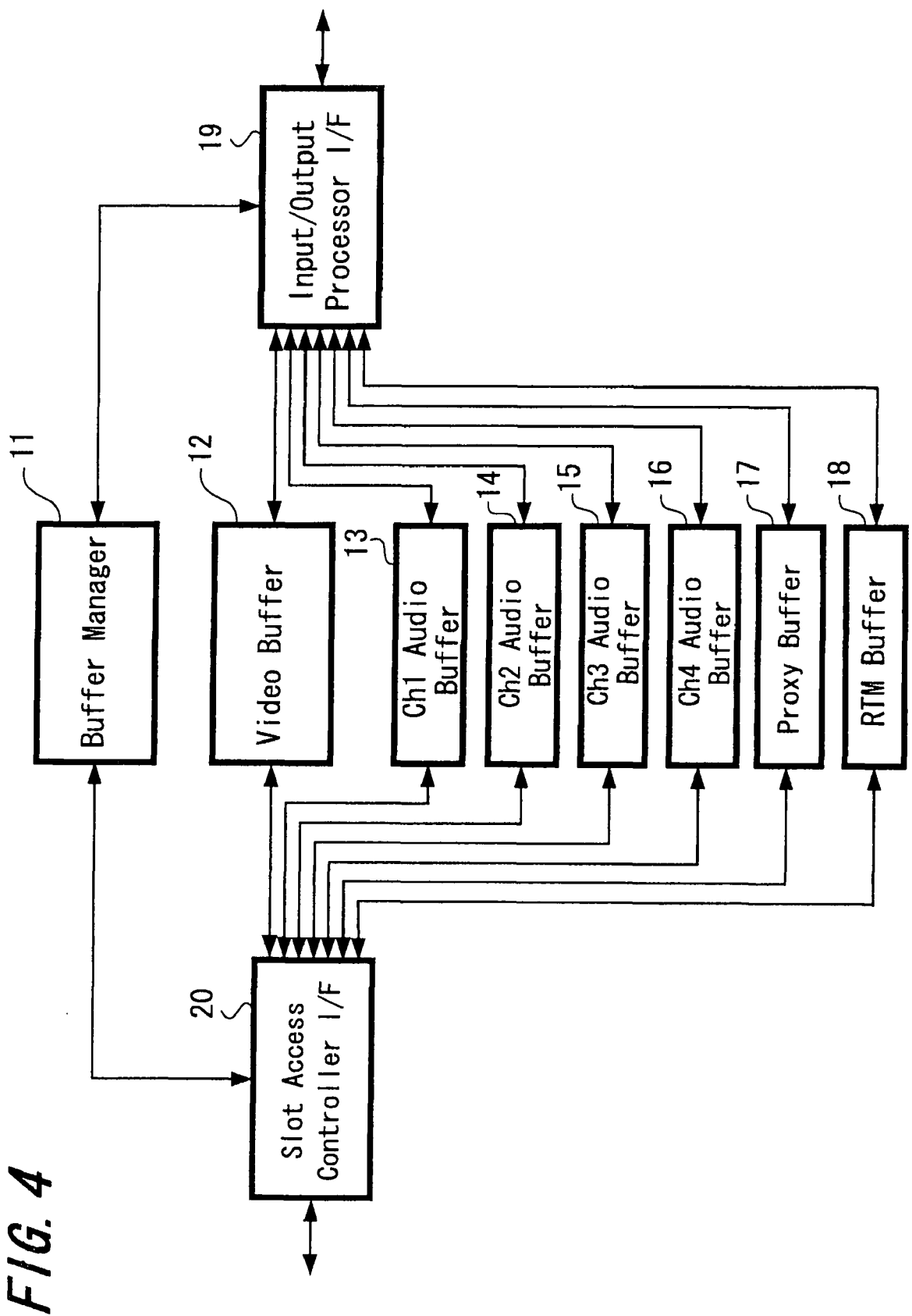
FIG. 4 is a block diagram illustrating a configuration example of buffer portions in FIG. 3.

FIG. 4 is a block diagram illustrating a configuration example of respective buffer portions 3. The configuration example represents that a clip including seven types of essence including video data, 4-channels audio data, proxy data (video data with low bit rate for editing video) and real-time metadata (e.g., information indicating time code or recording location) is respectively stored and reproduced via respective port Port-1 to port-n.

The buffer portions 3 include a buffer manager 11; buffer memories for accumulating various essence including a video buffer memory 12, a ch1 audio buffer memory 13, a ch2 audio buffer memory 14, a ch3 audio buffer memory 15; a ch4 audio buffer memory 16, a proxy data buffer memory 17, and a real time metadata buffer memory 18; and an input/output processor interface 19 that is an interface between the port input/output processors 4 and the buffer portion 3 (FIG. 3); and a slot access controller interface 20 that is an interface between the slot access controller 2 and the buffer portion 3 (FIG. 3).

In a case where a clip is stored from one of ports Port-1 to Port-n, the clip inputted from the port is processed via the port input/output processor 4 corresponding to the port, and then transmitted to the buffer portion 3. The clip is classified into respective types of essence including video data, 4-channels audio data, proxy data and real time metadata, by the input/output processor interface 19, and the classified data are respectively stored into the video buffer memory 12, the ch1 audio buffer memory 13, the ch2 audio buffer memory 14, the ch3 audio buffer memory 15, the ch4 audio buffer memory 16, the proxy data buffer memory 17 and the real time metadata buffer memory 18, respectively.

Further, information indicating how much essence of respective types is stored in the respective buffer memories 12 to 18 is transmitted from the input/output processor interface 19 to the buffer manager 11.

The buffer manager 11 calculates the values represented by Nvideo, Naudio1, Naudio2, Naudio3, Naudio4, Nproxy and Nrtm by converting current amounts of essence stored in the buffer memory 12 to 18 into the number of pages of the flash memory 1 based on the information from the input/output processor interface 19. It is then periodically evaluated whether or not the sum of the converted values has reached a value that satisfies the following equation:

$$N\text{video} + N\text{audio1} + N\text{audio2} + N\text{audio3} + N\text{audio4} + N\text{proxy} + N\text{rtm} \geq N\text{block} \qquad (1)$$

In the equation, N block represents the number of pages per block of the flash memory 1 (FIG. 3).

When the condition shown by the above equation is satisfied, the buffer manager 11 outputs a transfer request of the essence to the slot access controller interface 20. Further, although the condition of the above equation is not satisfied, the buffer manager 11 still outputs a transfer request of the essence to the slot access controller interface 20 at the end of the clip.

The slot access controller interface 20 reads out the essence from respective buffer memories 12 to 18 based on the transfer request. The slot access controller interface 20 then requests the slot access controller 2 (FIG. 3) to write the read out essence into one block of the flash memory 1 (FIG. 3) by aligning a writing position of the essence classified by type on a page unit basis in the flash memory. Notice that the slot access controller interface 20 requests the slot access controller 2 to capture to write the read out essence in one block of the flash memory by allocating "all-H" to a portion that fails to reach one block at an end of the clip.

Referring back to FIG. 3, the slot access controller 2 writes the essence at a timing of allocating time slots to respective ports Port-1 to Port-n transmitted from respective buffer portions 3(1) to 3(*n*) into one block of the flash memory 1 by aligning a writing position of the essence with a page unit on a essence type basis in the flash memory based on the request from the slot access controller interface 20 in respective buffer portions 3(1) to 3(*n*).

FIG. 5A is a diagram illustrating such a state described above where the clips from the ports Port-1 to Port-n are written into the flash memory 1. The essence relative to one block of first half of the P1-#1 indicating the first clip transmitted from the port-1 is written into a write-buffer (not shown) in the flash memory 1, written into one block 1*b* (top block in the figure) of the flash memory main body 1*a* from the write-buffer, and subsequently the write-buffer is released.

As shown in the upper portion of the figure, the P1-#1 represents a clip having a larger amount of data than the amount that one block may hold and is smaller than the amount that two blocks may hold. However, the residual essence of the P1-#1 is also written into the write-buffer as data relative to one block by allocating "all-H" to a portion that fails to reach an amount relative to one block, written into one block 1*b* (second block from top in the figure) of the flash memory main body 1*a* from the write-buffer, and the write-buffer is subsequently released.

As shown in the upper portion of the figure, respective essence indicating video data V, 4-channels audio data (A1 to A4), proxy data P and real time metadata RTM that configure the P1-#1 is written into one block of the flash memory 1 by aligning a writing position of the essence with a page unit on a essence type basis in the flash memory. Notice that due to the convenience of the figure, the fewer number of pages relative to one block is shown in FIG. 5; however, the actual number of pages may generally be more than the number of pages shown in FIG. 5.

Likewise, when the essence of the clips P1-#2 and P1-#3 indicating the second and third clips from the port-1, the essence of the P2-#1 indicating the first clip from the port-2, and the essence of the P3-#1 indicating the first clip from the port-3 have respectively been written into one block of the flash memory through the write-buffer by aligning a writing position of the essence with a page unit on a essence type basis, the write-buffer is released.

As illustrated in FIG. 5A, while aligning a writing position of the essence classified by type on a page unit basis, the classified essence is written by a block unit of the flash memory main body via respective ports. Specifically, in writing the essence into the flash memory, the types of the essence are page-alined and the ports for the essence are block-aligned.

Thus, since the write-buffer is released when the clip is read out from one port, the write-buffer may always be available irrespective of the number of the ports. Notice that the write-buffer may be used when the data transmitted from the next port is written by time division processing using timeslots.

Accordingly, garbage processing (copying processing of data performed in the write-buffer) performed due to write-buffer engagement may be prevented.

Figure 6:
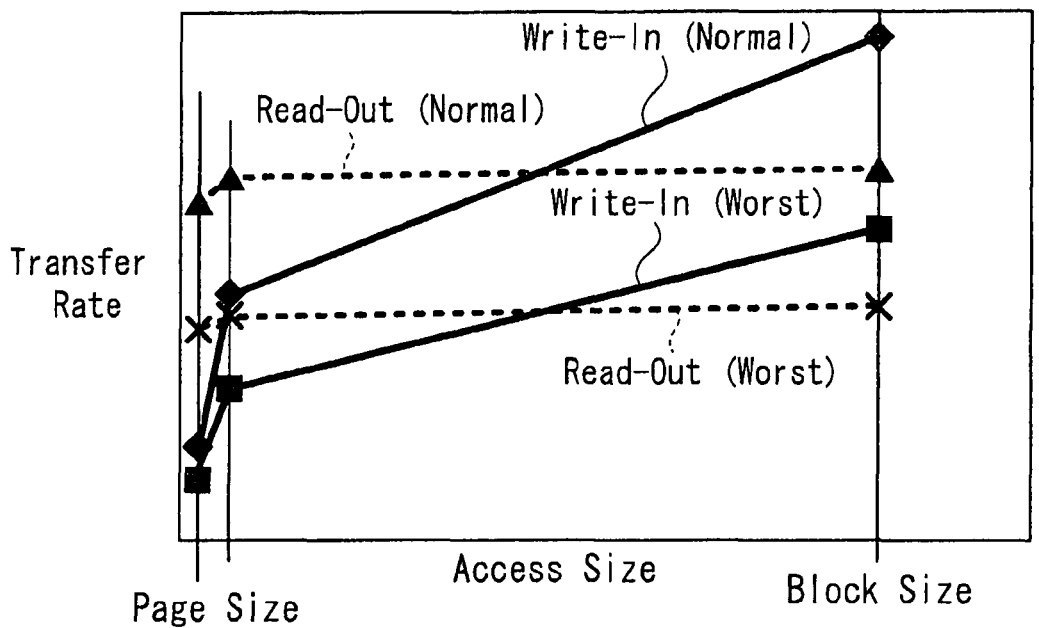
FIG. 6 is a graph plotting writing and reading rates to a flash memory in a case where no garbage processing has performed.

FIG. 6 is a graph illustrating a relationship between the writing and reading rates (transfer rates) for a flash memory in a case where no garbage processing is performed and a size (an access size) with which the writing or reading is simultaneously carried out. In addition, FIG. 7 is a graph illustrating a relationship between the writing and reading rates for a flash memory in a case where the garbage processing is performed and a size (an access size) with which the writing or reading is simultaneously carried out.

Figure 7:
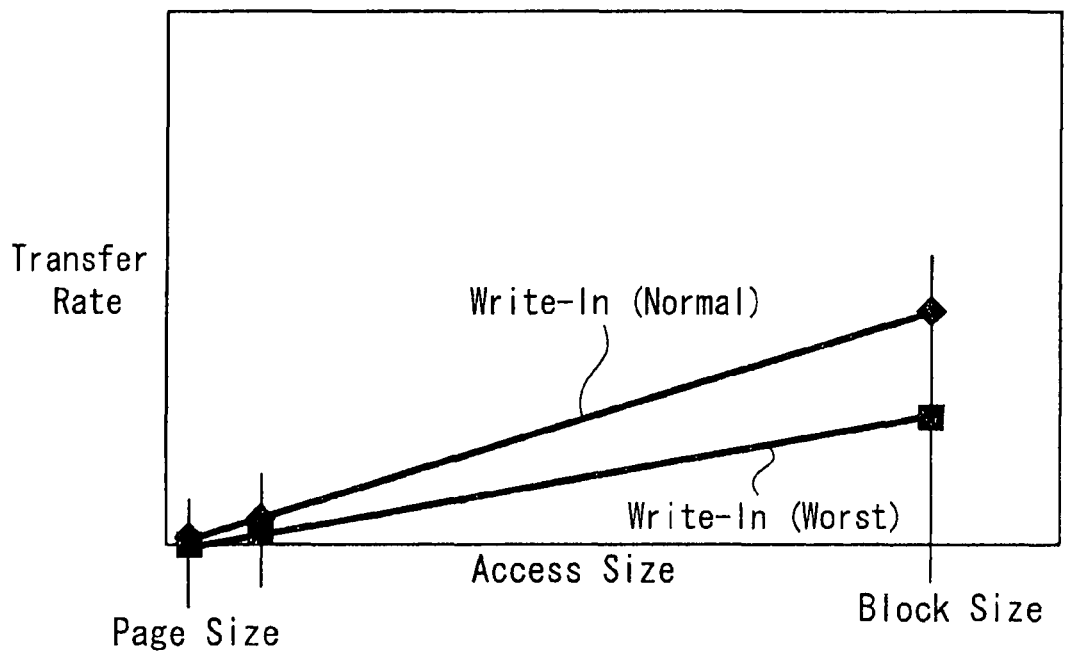
FIG. 7 is a graph plotting writing rates to a flash memory in a case where garbage processing has performed.

As clear from a comparison between FIG. 6 and FIG. 7, the writing rates to the flash memory drastically decrease due to conducting the garbage processing; however, no garbage processing is performed in the current flash memory apparatus. Therefore, a decrease in writing rates due to performing the garbage processing can be prevented and hence the clip may be written into the flash memory 1 at a high rate.

As shown in FIG. 6, the writing rates decrease in a case where data is written on a page unit basis as compared with a case where data is written on a block unit basis. However, since data are written into the flash memory 1 on a block unit basis, a decrease in the writing rate may be prevented.

In addition, since the clip is written on a block unit basis corresponding to each port, a certain amount of free space may be obtained by the block unit when one clip has been deleted. FIG. 5B shows the condition where the written clips P1-#2 in FIG. 5A was deleted.

Accordingly, in a filing system by which the clips in the flash memory 1 are controlled, the minimum unit of control (cluster) may be increased in size as a block, and processing such as defragmentation may not be necessary when reusing the free space.

Subsequently, processing by which a clip is reproduced from respective ports Port-1 to Port-n by referring to FIG. 3 and FIG. 4. In a case where a clip is reproduced from one port, the buffer manager 11 (FIG. 4) inside the buffer portion 3 corresponding to the port informs the slot access controller interface 20 of a necessary amount of data on a page unit basis for each type of the essence based on free space in respective buffer memories 12 to 18. The slot access controller interface 20 requests the slot access controller 2 to read the respective essence based on the information.

Based on the request from the slot access controller interface 20 inside respective buffer portions 3(1) to 3(*n*), the slot access controller 2 reads the respective types of the essence on a page unit basis from the flash memory 1 during allocating timeslots to respective ports Port-1 to Port-n, and the read out essence is then transmitted to the slot access controller interface 20 inside the buffer portions 3(1) to 3(*n*).

In the buffer portions 3, respective types of essence transmitted from the slot access controller 2 are stored in respective buffer memories 12 to 18, and readout by the input/output processor interface 19 from buffer memories 12 to 18. The respective types of essence read out are then integrated into one clip, which is then transmitted to the corresponding port input/output processor 4. The clip is then outputted from the corresponding port through processing of the port input/output processor 4.

Thus, since the page alignment has been carried out on an essence type basis when storing a clip, each type of the essence is read out on a page unit basis from the flash memory 1 when reproducing the essence. However, as shown in FIG. 6, in the flash memory, reading rates hardly decrease although data is read out on a page unit basis as compare to a case where data is read out on a block unit basis. Therefore, the clip may be read out from the flash memory 1 with high reading rates.

Furthermore, when reproducing two or more types of essence in combination inside two or more clips, necessary types of the essence inside the clips may selectively be read out from the flash memory 1 on a page unit basis. Accordingly, reduced amount of unused and unnecessary essence is read, resulting in maximizing the reading rate.

Figure 8:
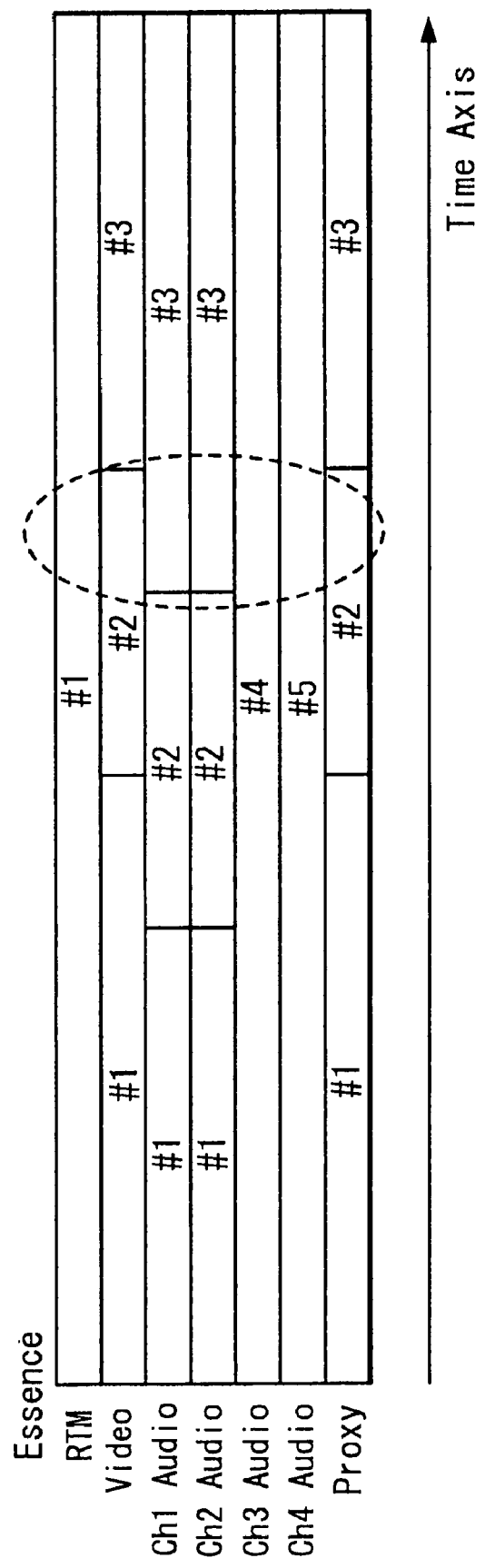
FIG. 8 is a diagram illustrating an EDL reproduction with AV split edit.

FIG. 8 is a diagram illustrating one example of such a method of reproducing data in which respective essence inside two or more clips is combined and reproduced when an EDL (Edit Decision List) used for an online edit is reproduced from the flash memory apparatus (referred to as "EDL reproduction with AV split edit" implying to reproduce video data and audio data from separate clips). For example, at the timing shown by a circled broken line, the four essence inside the following four clips is reproduced in combination; that is, the clips include real time metadata (RTM) inside clip number is one or clip #1 (port number is omitted); video data inside clip #2 (clip number is second); ch1 audio data inside clip #3 (clip number is third); ch2 audio data inside clip #3; ch3 audio data inside clip #4 (clip number is forth); ch5 audio data inside clip #5 (clip number is fifth); and proxy data inside clip #2.

In a case where an EDL reproduction with AV split edit is performed, reduced amount of unused and unnecessary essence is read by reading the essence on a page unit basis from the flash memory 1, thereby maximizing the reading rates (e.g., after the timing shown by a circled broken line in FIG. 8, when the clip for reproducing video data is switched from the clip #3 to the clip #2, the video data while reading from the clip #2 is still continuously read out).

As described above, one example is described where clip including seven types of essence including video data, 4-channels audio data, proxy data and real time data are respectively stored in or reproduced from a flash memory via a plurality of ports. However, an embodiment of the present invention may also be applied to a case where the clip including two or more types of essence other than those respectively stored in or reproduced from a flash memory via a plurality of ports, and also applied to a case where aggregate data including a plurality of types of data other than the clip used or edited is respectively stored in or reproduced from a flash memory via a plurality of ports.

It should be understood by those skilled in the art that various modifications, combinations, sub-combinations and alterations may occur depending on design requirements and other factors in so far as they are within the scope of the appended claims or the equivalents thereof.

What is claimed is:

1. A flash memory apparatus for storing data aggregate having a plurality of types of data to a flash memory and for reproducing the data aggregate from the flash memory via a plurality of ports, comprising:
    a plurality of access request means for requesting to write data in one block of the flash memory by aligning a writing position of one block data with a page unit on a data type basis of the flash memory when the data classified by type inputted via the ports corresponding to the access request means on the one-to-one basis are stored to reach an amount relative to one block of the flash memory; and
    access control means for writing the data in the flash memory during time division allocated per port based on the requests incited by the respective access request means,
    wherein the plurality of access request means and the plurality of ports have a one-to-one correspondence,
    wherein when the data input via a respective port reach the amount, the access control means writes the data input by the respective port into one block of the flash memory, and each type of the written data is aligned with a page unit of the flash memory, and
    wherein data input via more than one ports are prevented from being written into a same block of the flash memory by aligning the data with a block unit when the data reaches the amount and by allocating predetermined data to an empty portion of one block when a residual portion of the data is less than the amount so that garbage processing in the flash memory apparatus is prevented.

2. A flash memory apparatus according to claim 1, wherein the access request means for requesting to read data with a page unit on a data type basis from the flash memory when reproducing the data aggregate via the corresponding ports; and
    the access control means for writing and/or reading the data from the flash memory during time division allocated per port based on the requests incited by the respective access request means.

3. A flash memory apparatus according to claim 1, wherein the access request means includes:
    a plurality of buffer memories provided for each type of data;
    output means for outputting requests for transferring data when converting an amount of data stored in the buffer memories into the number of pages of the flash memory, and the sum of the pages reaches the pages relative to one block of the flash memory; and
    request means for requesting the access control means for writing data stored in the buffer memories in one block of the flash memory based on the transfer requests by aligning a writing position of the one block data with a page unit on a data type basis in the flash memory.

4. A flash memory apparatus according to claim 1, wherein the access request means for requesting to capture to write the stored data in one block of the flash memory when the data fail to reach an amount relative to one block of the flash memory at an end of the data aggregate.

5. A flash memory apparatus according to claim 1, wherein the data aggregate includes video data and audio data.

6. A method for storing data aggregate having a plurality of types of data input via a plurality of ports to a flash memory and reproducing data aggregate from the flash memory, comprising:
    a first step of requesting, with a plurality of access request means, to write data in one block of the flash memory by aligning a writing position of one block data with a page unit on a data type basis in the flash memory when the data classified by type that are inputted via the ports corresponding to the access request means on the one-to-one basis are stored to reach an amount relative to one block of the flash memory; and a second step of writing the data in the flash memory during time division allocated per port based on the requests incited by the first step, wherein the plurality of access request means and the plurality of ports have a one-to-one correspondence, wherein when the data input via a respective port reach the amount, the access control means writes the data input by the respective port into one block of the flash memory, and each type of the written data is aligned with a page unit of the flash memory, and wherein data input via more than one ports are prevented from being written into a same block of the flash memory by aligning the data with a block unit when the data reaches the amount and by allocating predetermined data to an empty portion of one block when a residual portion of the data is less than the amount so that garbage processing in the method is prevented.

7. A flash memory apparatus for storing data aggregate having a plurality of types of data to a flash memory and for reproducing the data aggregate from the flash memory via a plurality of ports, comprising:

a plurality of access request units configure to request for writing data in one block of flash memory by aligning a writing position of one block data with a page unit on a data type basis in the flash memory when the data classified by type that are inputted via the ports corresponding to the access request units on the one-to-one basis are stored to reach an amount relative to one block of the flash memory; and an access controller configured to write the data in the flash memory during time division allocated per port based on the requests incited by the respective access request units, wherein the plurality of access request units and the plurality of ports have a one-to-one correspondence, wherein when the data input via a respective port reach the amount, the access control unit writes the data input by the respective port into one block of the flash memory, and each type of the written data is aligned with a page unit of the flash memory, and wherein data input via more than one ports are prevented from being written into a same block of the flash memory by aligning the data with a block unit when the data reaches the amount and by allocating predetermined data to an empty portion of one block when a residual portion of the data is less than the amount so that garbage processing in the flash memory apparatus is prevented.

* * * * *